United States Patent [19]

Lambert

[11] Patent Number: 5,080,778
[45] Date of Patent: Jan. 14, 1992

[54] HYDROCARBON CONVERSION PROCESS USING NOVEL SILICA-SUBSTITUTED ALUMINAS

[75] Inventor: Susan L. Lambert, Rolling Meadows, Ill.

[73] Assignee: UOP, Des Plaines, Ill.

[21] Appl. No.: 546,610

[22] Filed: Jun. 29, 1990

Related U.S. Application Data

[63] Continuation-in-part of Ser. No. 289,855, Dec. 27, 1988, abandoned.

[51] Int. Cl.$^5$ .............................................. C10G 47/04
[52] U.S. Cl. .................................. 208/111; 208/120; 502/263
[58] Field of Search ........................................ 258/4-6, 258/120, 111, 112; 502/263

[56] References Cited

U.S. PATENT DOCUMENTS

| | | | |
|---|---|---|---|
| 2,425,463 | 8/1947 | Garrison | 502/231 |
| 2,483,130 | 9/1949 | Garrison | 502/231 |
| 2,483,131 | 9/1949 | Garrison | 502/263 |
| 2,858,267 | 10/1958 | Kennedy et al. | 208/111 |
| 3,318,821 | 5/1967 | Pollitzer et al. | 502/263 |
| 3,900,427 | 8/1975 | Riley et al. | 252/455 R |
| 4,501,655 | 2/1985 | Hilfman et al. | 258/111 |
| 4,503,023 | 3/1985 | Breck | 423/328 |
| 4,576,711 | 3/1986 | Ward et al. | 208/111 |
| 4,576,805 | 3/1986 | Chang et al. | 423/306 |
| 4,591,576 | 5/1986 | Chiang et al. | 502/65 |
| 4,597,956 | 7/1986 | Hinchey et al. | 423/328 |
| 4,617,108 | 10/1986 | Shyr et al. | 258/111 |
| 4,629,716 | 12/1986 | Kemp | 502/208 |
| 4,708,945 | 11/1987 | Murrell et al. | 502/263 |
| 4,711,770 | 12/1987 | Skeels et al. | 423/328 |
| 4,711,868 | 12/1987 | Shyr et al. | 502/263 |
| 4,753,910 | 6/1988 | Han et al. | 502/85 |
| 4,758,330 | 7/1988 | Kidd | 208/213 |
| 4,766,101 | 8/1988 | Nortier et al. | 502/164 |
| 4,778,779 | 10/1988 | Murrell et al. | 502/439 |
| 4,806,513 | 2/1989 | McDaniel et al. | 502/107 |
| 4,836,911 | 6/1989 | Skeels et al. | 208/111 |
| 4,868,147 | 9/1989 | Pearson et al. | 502/263 |

*Primary Examiner*—Anthony McFarlane
*Attorney, Agent, or Firm*—Thomas K. McBride; John F. Spears, Jr.

[57] ABSTRACT

Hydrocarbons are reduced in molecular weight in a conversion process wherein they are contacted with a non-zeolitic solid catalyst comprising an alumina, such as gamma alumina, which has been isomorphously substituted with silicon. The treated alumina will have a fluorine to silicon mole ratio of about 0.8:1 to about 1.3:1. For use in hydrocracking, the catalyst contains a metal hydrogenation component and possibly one or more other inorganic oxides such as silica-alumina. Other non-zeolitic materials such as delaminated clay or silica-alumina may also be composited into the catalysts.

21 Claims, 1 Drawing Sheet

HYDROCARBON CONVERSION PROCESS USING NOVEL SILICA-SUBSTITUTED ALUMINAS

CROSS-REFERENCE TO RELATED APPLICATION

This application is a continuation-in-part of my prior copending application Ser. No. 07/289,855 filed Dec. 27, 1988.

FIELD OF THE INVENTION

The invention relates to the hydrocarbon conversion processes referred in the petroleum refining arts as cracking and hydrocracking. Hydrocracking processes are normally classified in Class 208 of the U.S. Patent and Trademark Office classification system. The subject invention also relates to a novel composition of matter useful as a hydrocarbon conversion catalyst and to processes using this novel composition of matter. The novel composition of matter is an alumina which has been chemically treated to effect the isomorphous substitution of silicon atoms into the pre-existing structure of the alumina.

DESCRIPTION OF THE PRIOR ART

Hydrocracking processes are used in many major petroleum refineries. The primary utility of hydrocracking is to upgrade residual petroleum fractions and heavy distillates. Accordingly, there has been developed a large body of prior art relating to the materials which are suitable as hydrocracking catalysts, the preparation of hydrocracking catalysts and the methods of using these catalysts to successfully convert many petroleum fractions. U.S. Pat. No. 3,900,427 issued to K.L. Riley et al. is believed relevant for its general description of the various materials which may be employed as hydrocracking catalysts and methods for compounding these materials into a number of matrices including those comprising silica-alumina, alumina, and other inorganic oxides. The reference is also believed pertinent for its disclosure of the use of Group VIB and Group VIII metals on the catalyst.

U.S. Pat. No. 4,576,711 issued to J.W. Ward et al. is believed pertinent for its disclosure of a family of modern hydrocracking catalysts representative of the present state of the art. The catalyst employed in this process comprises a dispersion of silica-alumina in alumina. This dispersion is admixed with a chemically treated Y-zeolite prepared by contacting the Y-zeolite with an aqueous solution of ammonium hexafluorosilicate (($NH_4)_2SiF_6$). This contacting results in the dealumination of the Y-zeolite and the production of a material which has been shown to be superior for use in hydrocracking catalyst. The reference illustrates the production and use of hydrocracking catalysts prepared using a stabilized Y zeolite and proprietary zeolites referred to as LZ-10 and LZ-210.

U.S. Pat. No. 4,758,330 issued to D.R. Kidd is believed pertinent for its teaching in regard to a hydrotreating process which employs a catalyst support comprising alumina as a major component and silica as a minor component. This material is produced by the addition of a solution of alkali metal silicate to a dispersed alumina hydrogel followed by heating the formed alumina-silica hydrogel under dehydrating conditions.

The dealumination of zeolites is described in U.S. Pat. 4,503,023 issued to D.W. Breck et al. This reference is believed pertinent for its teaching as to a method of dealumination of zeolites, with the aqueous ammonium fluorosilicate solution used in this patent being equivalent to a reagent which may be employed in producing the silica-substituted alumina of the subject invention. This patent is specific to the production of a silicon-enhanced zeolite referred to in the art as LZ-210.

U.S. Pat. No. 4,753,910 issued to Han et al. is believed pertinent for its teaching of a modification of the method of zeolite dealumination disclosed in Breck et al. U.S. Pat. No. 4,503,023. During or after the aluminum removal step, the zeolite is contacted with an aqueous solution containing a water soluble fluoride capable of reacting with the insoluble aluminum fluoride to produce a water soluble species. The reference indicates that the retained fluoride content was reduced and the hexane cracking activity of the treated zeolite was increased. The mole ratio of fluoride to aluminum of the prior art and resulting materials is discussed.

U.S. Pat. No. 4,597,956 issued to R.J. Hinchey et al. provides a summary of the methods which can be employed for increasing the silica to alumina ratio of zeolite aluminosilicates by the removal of aluminum. This patent is also believed relevant for its teaching in regard to an improvement to the above cited U.S. Pat. No. 4,503,023 to Breck et al. The patent is specific to a method of removing fluoride compounds such as aluminum trifluoride from aluminosilicates by contact with a solution of a soluble aluminum compound such as aluminum sulfate.

U.S. Pat. No. 4,711,770 issued to G.W. Skeels et al. is related to the above cited U.S. Patent to Breck et al. but is believed relevant for its additional teaching in regard to the preparation and hydrocarbon conversion activity of crystalline zeolitic aluminosilicates such as LZ-210 which are produced by the insertion of extraneous silicon atoms into the crystal lattice of an aluminosilicate.

U.S. Pat. No. 4,806,513 issued to M.P. McDaniel describes a surface silicated alumina which may also be fluorided. This reference suggests ammonium silicofluoride ($NH_4)_2SiF_6$ as a treating agent in the preparation of supports for chromium polymerization catalysts.

U.S. Pat. No. 4,758,330 issued to D.R. Kidd describes a composition of matter described as silica-modified alumina comprising alumina as the major component and silica as the minor component prepared by admixing solutions of an aluminum salt, alkali metal aluminate and alkali metal silicate.

U.S. Pat. No. 4,591,576 issued to R.L. Chiang et al. is believed pertinent for its teaching that a formed catalytic composite of alumina and a zeolite intended for use as a cracking catalyst can be treated with a fluoro salt to produce a composite having a low $Na_2O$ content without the performance of a specific calcination step intended to remove sodium cations. The treating may include contact with an aqueous solution of ammonium hexafluorosilicate.

U.S. Pat. No. 2,483,130 issued to A.D. Garrison is believed relevant for its teaching of the preparation of catalytic cracking catalyst by treating alumina with anhydrous silicon tetrafluoride to yield a product which has taken up as much as 5 to 15 wt. percent silicon tetrafluoride.

BRIEF SUMMARY OF THE INVENTION

The invention claimed herein is a hydrocarbon conversion process, such as a FCC-type cracking or a hydrocracking process, characterized by the utilization of a zeolite-free catalyst comprising a novel alumina. The novel alumina is the result of the chemical treatment of alumina to effect the isomorphous substitution of silicon into the alumina structure. Preferably a crystalline gamma alumina is treated to produce the novel material. The subject invention is distinguished from the previously cited references by insertion of silicon atoms into an alumina rather than into a zeolite and in one embodiment by the absence of any zeolitic component in the catalyst. Other distinguishing features of the alumina relate to its fluorine content and fluorine to silicon mole ratio.

Other embodiments of the subject disclosure include the substitution of silicon into aluminas other than gamma alumina, the utilization of the novel substituted alumina in combination with other inorganic materials and the method of production of the novel alumina composition. In further embodiments of the invention the novel silicon substituted alumina is formulated with other materials, such as conventionally prepared silica-alumina, and impregnated with various metals such as the Group VIII hydrogenation metals. The subject invention includes the use of these composite materials in a number of hydrocarbon conversion processes which reduce the average molecular weight of the feed hydrocarbons or reduce the viscosity of the feed stream.

In the hydrocracking embodiment the novel alumina of the subject invention may be utilized in conjunction with at least one other inorganic oxide material such as a zeolite or a silica-alumina together with one or more Group VIB and/or Group VIII metals. One broad embodiment of the subject invention may be characterized as a hydrocracking process which comprises contacting a feed stream comprising $C_6$-plus hydrocarbons and hydrogen with a solid catalyst maintained at hydrocracking conditions and recovering a product stream, with the catalyst comprising gamma alumina comprising 0.01 to 50.0 wt. percent isomorphously substituted silicon.

DETAILED DESCRIPTION

It is often desirable to reduce the molecular weight of a hydrocarbonaceous compound or to rearrange its structure. Normally this is to provide hydrocarbons having a higher commercial value. Many such processes are often referred to as cracking processes. The word "cracking" however is associated in the petroleum refining art with catalytic cracking which occurs in the substantial absence of hydrogen. For instance cracking may be performed in a fluidized catalytic cracking (FCC) process. The art also recognizes the different characteristics and technology associated with the hydrocarbon conversion process referred to as hydrocracking. In hydrocracking a substantial amount of hydrogen is present in the reaction zone. Both of the processes are described in more detail below.

The silicon-substituted materials of the subject invention have been found to have significant catalytic activity for reducing the molecular weight of hydrocarbons. It is contemplated that these materials can be successfully employed in both the cracking environment and the hydrocracking environment.

One embodiment of the invention may be characterized as a process for reducing the average molecular weight of hydrocarbons which comprises contacting a $C_6$-plus feed hydrocarbon with an essentially zeolite-free solid catalyst at conversion-promoting conditions and recovering a product, with the catalyst comprising silicon-substituted alumina prepared by contacting an alumina with a silicon containing solution at substitution promoting conditions, with the silicon-substituted alumina containing from 0.11 to 15.0 wt. percent silicon from 0.1 to 15 wt. percent fluorine and with the alumina having a silica to fluorine mole ratio of 0.8:1 to 1.3:1.

Hydrocarbon conversion processes which reduce the molecular weight of feed compounds by breaking them into smaller hydrocarbon molecules find utility in a wide variety of situations. In many refineries they are used to upgrade residual oils such as vacuum gas oils or demetallized oils to useful distillates such as naphtha or kerosene as described in more detail below. This is often done by hydrocracking, but very large quantities of light residual oils are converted by fluidized catalytic cracking. Hydrocracking is also used to produce light hydrocarbons suitable for use as LPG from naphtha. It may also be desirable to perform some breakage of hydrocarbon structures to remove specific elements from the chargestock or to destroy certain components of a particular process stream. Hydrocracking could therefore be desired in a process to desulfurize a hydrocarbonaceous feed including those derived from coal. A cracking function may also be desirable in catalysts used in the destruction of treatment of hazardous waste, for example chlorinated hydrocarbons.

The subject materials can also be employed if desired in catalysts employed primarily to reduce the viscosity of a heavy distillate hydrocarbon fraction such as a "lube oil" fraction. This catalytic dewaxing is intended to improve the viscosity index of the feed which can be achieved by the isomerization or cyclization of high molecular weight paraffins having a highly linear structure. Catalytic dewaxing normally entails some cracking, but this is not the objective of this particular hydrocarbon conversion process.

Activity, selectivity and stability are the three main catalytic properties by which a hydrocracking catalyst is evaluated. Activity usually is determined by comparing the temperature at which various catalysts must be utilized under otherwise constant hydrocracking conditions with the same feedstocks and same conversion rate of products boiling below a specified temperature. The lower the activity temperature for a given catalyst, the more active the catalyst is for the specified process. Selectivity of hydrocracking catalysts is a measure of the yield of a desired product. Stability is a measure of how well a catalyst maintains its activity and selectivity over an extended period of time when treating a given hydrocarbon feedstock. Stability is generally measured in terms of the rate of change in temperature required per day to maintain a given conversion rate.

The goal of catalysis is to provide a catalyst with the best possible combination of activity, selectivity and stability. Catalysts employed in hydrocracking processes usually comprise a metal component in intimate admixture with a support material. The activity, selectivity and stability of the catalysts vary widely when different supports are used. Support materials known to the hydrocracking art comprise porous refractory inorganic oxide materials such as amorphous silica alumina, alumina and the like, as well as crystalline aluminosilicate zeolites, such as zeolite-Y.

Support materials consisting essentially of amorphous refractory oxides generally have relative poor activity, but high selectivity, while support materials comprising zeolites generally provide high activity, but low selectivity. It has been theorized that the low selectivity of zeolites is due in part to their small uniform pore size which restricts access by larger molecules. The larger pore openings of the subject treated aluminas may be advantageous for heavy hydrocarbon feed streams.

The preparation of zeolites can be a time-consuming process requiring significant capital outlays for equipment and labor. The zeolitic components of cracking catalysts are therefore normally more expensive than other inorganic oxide components such as alumina or silica-alumina. It is therefore an objective of the subject invention to provide a material which can be fully or partially substituted for zeolitic components of catalysts including cracking and hydrocracking catalysts. It is another objective of the subject invention to provide a hydrocracking process which requires a smaller quantity of zeolitic components. As the selectivity and yield structure of a cracking or hydrocracking process is often greatly influenced by the cracking properties of the catalyst support or base materials, it is a further objective of the invention to provide a novel catalyst support component suitable for use in cracking and hydrocracking processes. Another objective of the invention is to provide a novel class of aluminas which possess catalytic hydrocracking, cracking and dewaxing activity and a method of manufacturing these novel aluminas.

In the subject invention silicon is inserted into the structure of an alumina or alumina-containing material. Aluminum atoms are removed. The resultant material is referred to herein as silicon-substituted alumina. As the substitution results in a material having enhanced catalytic properties the resultant materials are also referred to herein as a silicon enhanced alumina or SEAL. These two terms are used interchangeably herein.

As illustrated by the representative prior art discussed above, significant research efforts have been directed to the production of improved or novel materials for use in catalysis through the dealumination or modification of zeolitic materials. In contrast to these efforts, the subject invention concerns the insertion of silicon into an alumina-containing pre-existent nonzeolitic material. The subject invention may therefore be broadly characterized as being related to the production of novel compositions of matter by the insertion of silicon into a pre-existing nonzeolitic inorganic oxide framework. The pre-existing inorganic oxide framework may be a highly pure form of alumina, with the alumina being either amorphous or crystalline.

The subject invention is however believed to be also applicable to the insertion o silicon into inorganic f oxides which comprise other elements besides aluminum. For instance, it is contemplated that the subject invention could be utilized to substitute silicon into the structure of a silica-alumina, aluminophosphates, a clay or other naturally occurring compound, a metal aluminate, etc. It is also contemplated that the subject method produces novel materials when applied to metallophosoaluminates as described in U.S. Pat. 4,713,227.

As some of the materials mentioned above as suitable candidates for silicon insertion are not known to be highly active cracking materials, the materials formed by insertion of silicon may not possess cracking activity. Other materials may possess only moderate acidity and cracking activity. Nevertheless treatment according to the subject invention provides a novel composite material having properties different from that of the untreated starting material. For instance, although the cracking capacity of a material such as an alumina phosphate may not be sufficiently increased by treatment as described herein for it to be effective as a component of a cracking catalyst, the adsorptive capacity or adsorptive selectivity of the material may be affected. As a further example clays are widely used in adsorbents. Substitution of an additional amount of silicon into a clay would affect the electrical properties of the clay on an atomic scale and therefore affect the adsorptive properties of the adsorbent. Therefore, the subject invention also relates to the preparation of novel adsorbents in addition to the preparation of novel cracking and hydrocracking catalysts. A silicon-substituted alumina adsorbent would be regenerable by combustion techniques if used to remove organic compounds from a process stream. The subject silicon-substituted aluminas have been found to lack anion exchange capacity. Cation exchange is, however, possible.

The subject silicon-substituted alumina materials are expected to have some properties similar to that of zeolites. Therefore, they can be used and formulated into composites in a manner similar to that employed for zeolites. For instance, the active alumina of the subject invention can be composited with a number of relatively inert or unmodified inorganic oxides such as untreated alumina or silica-alumina as, for example, in the manner described in U.S. Pat. No. 4,576,711.

Catalysts containing the subject silicon-enhanced alumina can be essentially free of any zeolitic or molecular sieve component. That is, they would contain less than 0.1 wt. percent zeolite and/or molecular sieve material. One embodiment of the subject invention may accordingly be characterized as a hydrocarbon conversion process which comprises contacting a feed hydrocarbon with an essentially zeolite-free catalyst comprising a silicon-enhanced alumina maintained at hydrocarbon conversion conditions. Hydrocarbon conversion is intended to indicate reactions which reduce the molecular weight of the feed hydrocarbon or which change the structure of the feed hydrocarbon by isomerization or cyclization.

Alternatively, the subject silicon-substituted materials can be used in admixture with another active component such as a zeolite. A preferred combination includes the subject material and a Faujasite-type zeolite such as the type X or Y zeolites. Another possible combination comprises the subject SEAL with a type L zeolite.

Some zeolites are not as durable as the alumina or silica-alumina materials widely used as catalyst support components. A valuable function of the more rugged components is often considered to be the production of a more durable and less fragile catalyst particle. As the subject silicon-substituted aluminas will have physical properties (crush strength, hardness, etc.) similar to that of the untreated alumina, catalysts produced using the subject silicon-substituted aluminas do not require additional inorganic oxides intended to produce more rugged materials. That is, catalyst produced from a silicon-substituted alumina would not require additional untreated alumina or silica-alumina support materials to provide a hard abrasion resistant catalyst. The fragility of the active cracking component therefore does not become a constraining factor in the optimization of the catalyst formulation. Accordingly, larger amounts of silicon-substituted alumina may be formulated into the catalyst compared to a less durable zeolitic material. A higher percentage of a silicon-substituted alumina can be employed to compensate for any lower activity on the part of the silicon-substituted alumina as compared to the zeolitic material. As an alternative to varying the amount of silicon-enhanced alumina formulated into a composite, the catalytic activity may be adjusted by control of the level of silicon substitution.

In general, zeolites are metal aluminosilicates having a crystalline structure such that a relatively large adsorption area is present inside each crystal. The classical structure of zeolite Y, and other zeolites, is three-dimensional frameworks of $SiO_4$ and $AlO_4$ tetrahedra cross-linked by the sharing of oxygen atoms. The electrovalence of the tetrahedra containing aluminum is balanced by the presence of cations such as metal ions, rare earth metal ions, alkali metal ions, ammonium ions, amine complexes and hydrogen ions. The void spaces in the framework may be occupied by water molecules. Normally, the crystalline zeolite occurs or is prepared in the alkali metal form. The classification of a material as zeolite Y is made on the basis of chemical composition and by the material exhibiting a well known X-ray diffraction pattern. A Y zeolite may contain germanium, gallium, phosphorous or boron in its structure together with or in place of the traditional silica and alumina.

Known zeolites used in hydroprocessing catalysts include the natural zeolites faujasite, mordenite, erionite and chabazite, and synthetic zeolites A, Beta, L, X and Y. The subject silica-substituted alumina may be used in combination with any of these zeolites.

As previously mentioned, it is specifically contemplated that zeolite components having cracking activity can be used in combination with the subject silica-substituted alumina. To produce a zeolite having cracking activity, the alkali metals are usually replaced with multivalent metal-containing cations, hydrogen ions, or hydrogen ion precursors (e.g. ammonium ion). This replacement of cations is generally accomplished by ion exchange, a method well known in the art wherein the zeolite in the sodium or other alkali metal form is contacted with an aqueous solution containing hydrogen ions, ammonium ions, rare earth ions, or other suitable cations. Replacing even a portion of the sodium ions in a Y-zeolite produces a zeolite having some cracking activity, but reducing the alkali metal content to less than 5 wt.%, preferably to less than 1 wt.% and most preferably to less than about 0.5 wt.% (calculated at the alkali metal oxides), results in a material having substantial cracking activity.

The catalytic composition used in the subject process may comprise a crystalline Y-type zeolite. This zeolite is widely used in hydrocracking catalysts. The Y-type zeolite is generally disclosed in U.S. Pat. No. 3,130,007, which is incorporated herein by reference. The chemical formula for zeolite Y expressed in terms of moles of oxides may be written as $$0.9\pm0.2Na_2O:Al_2O_3:wSiO_2:xH_2O$$

wherein w is a value from 3 to about 6 and x may be a value up to about 9. A hydrocracking catalyst should contain at least 1 wt.% and preferably 2 wt.% Y-zeolite. Less than 15 wt.% of the hydrocracking catalyst should be Y-type zeolite.

In the formula given above the silica to alumina ratio ranges from 3 to 6. This is the lattice framework ratio of the as synthesized material. All references herein are to such framework silica:alumina ratios rather than bulk ratios and hence require determination by means such as NMR techniques rather than chemical analysis. Y zeolites having silica to alumina ratios in this range are useful for hydrocracking and for fluidized catalytic cracking. However, it is recognized in the art that Y zeolites of this type had stability problems when used in such processes. The use of "ultrastable Y" zeolites, described below in conjunction with FCC catalysts, has become widespread. These catalysts are basically the result of removing aluminum from the zeolite structure. Many types of dealumination procedures are known in the art. For instance simple ion exchange with an ammonium salt solution followed by washing and high temperature hydrothermal treatment is effective in performing one type of dealumination. (See pg. 320–330, *Zeolite Chemistry and Catalysis*. J.A. Rabo, *American Chemical Society Monograph* 171, 1976 which is incorporated herein by reference.) For instance U.S. Pat. Nos. 4,654,316 and 4,654,454 describe dealumination processes based upon use of a series of aqueous solutions to perform selective surface dealumination. U.S. Pat. No. 4,701,431 issued to L.A. Pine is incorporated herein by reference for its excellent discussion of the types of dealumination and methods for dealumination. This reference also addresses some of the different meanings applied to dealumination. The patent describes exchange by rare earth metal ions as a method to stabilize a faujasite type alumina deficient zeolite in the dealuminated state.

The above discussion of dealumination in the production of highly stable Y-zeolites is presented because such materials can be a highly desired component of a hydrocracking, FCC or hydrotreating catalyst which also contains the silica-substituted alumina of the subject invention.

The preferred Y-zeolite used as a component of a hydrocracking catalyst has a framework silica:alumina ratio above 8.0 and will have a unit cell size less than about 24.55 Angstroms. Preferably the unit cell size is between 24.20 and 24.45 Angstroms. More preferably the zeolite unit cell size is between 24.25 and 24.35 Angstroms. Such materials are also normally characterized by a surface area between about 400 and 700 m²/g and a low level of alkali metal components, primarily sodium. The alkali metal concentration in the preferred Y-zeolite is less than 0.5 wt.% as calculated as the alkali metal oxides.

Another preferred zeolite for use in the catalytic composite of the present invention is a crystalline aluminosilicate zeolite of the high silica type such as ZSM-5, ZSM-11, ZSM-12, ZSM-23, ZSM-35, ZSM-38, with ZSM-5 being preferred. ZSM-5 is a known zeolite described in U.S. Pat. No. 3,702,886; ZSM-11 is more fully described in U.S. Pat. No. 3,709,979; ZSM-12 is described in U.S. Pat. No. 3,832,449; ZSM-23 is described in U.S. Pat. No. 4,076,842; and ZSM-38 is more fully described in U.S. Pat. No. 4,046,859, herein incorporated by reference in its entirety. These zeolites are known to readily adsorb benzene and normal paraffins, such as n-hexane, and also certain mono-branched paraffins, such as 2,2-dimethylbutane, and polyalkylaromatics, such as metaxylene. These zeolites are also known to have a silica-to-alumina ratio of at least 12, and a constraint index, as defined in U.S. Pat. No. 4,229,282, within the range of 1 to 12. A ZSM zeolite may be incorporated into a matrix formed by the subject silicon-substituted alumina or both the ZSM zeolite and the silicon-substituted alumina may be incorporated into a matrix formed by one or more of the refractory inorganic oxides described herein.

The starting materials which are treated to produce the subject silicon-substituted alumina may be in the form of a powder, slurry, crushed or spray dried effluent of a support manufacturing step or a formed support particle having the desired shape of the finished catalyst. For ease of solids handling the treatment of formed supports rather than powders is preferred. The supports may have various shapes as described herein. A particularly preferred shape is a small diameter sphere. These may be produced by the well known oil-drop method which comprises forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 200o to about 300° F. (93–149° C.) and subjected to a calcination procedure at a temperature of about 850° to about 1300° F. for a period of about 1 to about 20 hours. This treatment effects conversion of the alumina hydrogel to the corresponding crystalline gamma-alumina.

Preferred carrier materials have an apparent bulk density of about 0.3 to about 0.7 g/cc and surface area characteristics such that the average pore diameter is between about 20 and 300 Angstroms, the pore volume is about 0.1 to about 1 cc/g. Again, the larger pores, as compared to zeolites may be useful for processing heavier feeds and provide a higher selectivity.

One form of alumina highly suitable for use in preparing silica-substituted alumina has been characterized in U.S. Pat. Nos. 3,852,190 and 4,012,313 as a byproduct from a Ziegler higher alcohol synthesis reaction as described in Ziegler's U.S. Pat. No. 2,892,858. For purposes of simplification, the name "Ziegler alumina" is used herein to identify this material. It is presently available from the Conoco Chemical Division of Continental Oil Company under the trademark Catapal. This material is an extremely high purity alpha-alumina monohydrate (boehmite) which after calcination at a high temperature has been shown to yield a high purity gamma-alumina. It is commercially available in three forms: (1) Catapal SB—a spray dried powder having a typical surface area of 250 m$^2$/g; (2) Catapal NG—a rotary kiln dried alumina having a typical surface area of 180 m$^2$/g; and (3) Dispal M—a finely divided dispersable product having a typical surface area of about 185 m$^2$/g.

The silicon-substituted or silicon-enhanced aluminas of the subject invention can be produced using the same general conditions and aqueous solutions used to remove aluminum and insert so called "extraneous" silicon into zeolites. A highly suitable technique for production of silicon substituted aluminas may therefore be patterned after the methods disclosed in the previously cited U.S. Pat. Nos. 4,597,956; 4,711,770 and 4,753,910 which are cited above. Similar work is described in the paper entitled, "Zeolite Chemistry V-Substitution of Silicon for Aluminum in Zeolites via Reaction with Aqueous Fluorosilicate" published at page 87 of *Proceedings of 6th International Zeolite Conference.* 1983, edited by David Olson; Butterworth, Guildford, U.K. A further reference in this area is U.S. Pat. No. 4,610,856 issued to D.W. Breck et al. These five references are incorporated herein by reference for their teaching of methods of silicon insertion, which may be adapted for use in the subject invention. Further guidance may be obtained from the article entitled, "Faujasites Dealuminated with Ammonium Hexafluorosilicate: Variables affecting the Method of Preparation" by G. Garralon et al. appearing at page 268 of *Zeolites,* Vol. 8, July 1988.

Suitable silicon substitution promoting conditions include a temperature of 10–125° C. and preferably 20 to 95° C., with sufficient pressure to maintain liquid phase conditions. The conditions also comprise a pH in the broad range of about 3 to about 7, with a preferred pH range being from 5 to 7. The conditions also include the presence of an aqueous solution containing silicate ions. Preferably the solution contains a fluorosilicate salt such as ammonium fluorosilicate. Other materials reported in U.S. Pat. 4,503,023 include $Li_2SiF_6$, $K_2SiF_6$ and $MgSiF_6$. The solution containing the silicon ions is preferably added to a continuously stirred aqueous slurry of the alumina to be treated, with addition being incrementally or continuously at a slow rate such that addition preferably occurs over a time period in excess of 15 minutes.

The amount of silicon substituted into the alumina could produce a material containing from about 0.01 to about 50 wt. percent silicon. A preferred range of silicon insertion is from 0.1 to 18 wt. percent. A highly preferred range of silicon content of the finished material is 0.1 to 15 wt. percent. It is especially preferred that the processes of the subject invention are performed using a silicon-substituted alumina containing 0.2–12.0 wt.% silicon. Lower amounts of silicon will be desirable for hydrocarbon conversion processes which require lower levels of acidity.

As described in the references cited above a number of methods are known for effecting the dealumination of a crystalline zeolitic material. While the subject method is exemplified using an aqueous ammonium hexafluoride solution to treat the alumina similar to some prior art zeolite treating methods, these dealumination methods are not described as being of general applicability. Some of the other dealumination methods are distinguishable by several points. First the subject invention starts with an alumina rather than a zeolitic material. Second the subject invention relates to the insertion of silicon after the removal of aluminum. Methods, such as those involving halogen gases, which merely remove aluminum without allowing for its replacement by silicon therefore do not perform the basic step of the subject invention. Such methods therefore cannot be used. This allows the characterization of the treating reagent as one which contains available silicon. Preferably the treating reagent will comprise both silicon and halogen atoms.

In the subject invention aluminum atoms are removed from the material being treated. For instance, the aluminum is believed to be present in the powdery fines material produced in the use of the preferred ammonium hexafluoride solution. These fines contain ammonium tetrafluoride-aluminate ($NH_4$)$AlF_4$. This removal of aluminum atoms distinguishes the subject material and preparation method from those effected solely by the addition of silicon. Admittedly, some aluminum removed from the structure of the article being treated may remain as for instance in an aluminum-fluoride, but a significant amount (over 40 wt. percent of the displaced aluminum) is removed during treatment. This removal requires the aluminum to be converted to a species which can be easily removed by the treating medium. The use of an aqueous treating medium is therefore preferred. The term "isomorphous substitution" is used in its normal sense and is intended to indicate the replacement of an aluminum atom, which is removed from the system, by a silicon atom.

Two distinguishing features of the subject alumina are its absolute fluorine content and its fluorine to silicon mole ratio. The subject silicon-substituted alumina should contain from about 0.1 to about 15 wt. percent fluorine. They should contain from about at least 0.4 and preferably at least about 3 wt. percent fluorine. This fluorine content is considerably above that commonly found in the silicon-substituted zeolites, such as those tradenamed LZ-210 and prepared by the method described in the previously cited U.S. Pat. No. 4,503,023.

The second fluorine-related distinguishing feature of the subject alumina is its fluorine to silicon mole ratio. This ratio is expected to be less than 1.5 and normally less than 1.3. When the subject materials are calcined there can be some loss of fluorine and the fluorine to silicon ratio can drop below 1:1. A general range of fluorine to silicon mole ratios of the subject material is from about 0.8:1 to about 1.3:1.

EXAMPLE 1

Preparation of Catalysts

The starting material was calcined spherical alumina particles produced by the well known "oil dropping"-'technique. This technique is described in U.S. Pat. No. 2,620,314, which is incorporated herein by reference, and in the text above. The spheres had a relatively small diameter of about 0.1588 cm (1/16 inch), an apparent bulk density of about 0.5 g/cc, a pore volume of about 0.95 cc/g and a surface area of about 194 $m^2$/g. The average pore radius in the starting material was 98 Angstroms. This material had been analyzed to contain 50.9 weight percent aluminum, about 10 ppm sodium, less than 100 ppm silicon, 0.19 weight percent chlorine and less than 0.01 weight percent fluorine.

Sample "A" was prepared by slurrying 10.00 g (VF) of the above described alumina spheres in 100 cc deionized water and heating to 88° C. Ammonium hexafluorosilicate (3.50 g) was dissolved in 20.6 g deionized water. The ammonium hexafluorosilicate solution was added dropwise, using an addition funnel, over the course of 30 minutes while the slurry was stirred. The slurry was stirred for an additional 60 minutes at 80-90° C. after the addition was complete. The solids were filtered off and washed twice with 150 cc deionized water. The solids were dried overnight at 110° C. and then calcined at 500° C. for 2 hours. The solids consisted of whole spheres and fine powder. The sample was ground to insure uniform analysis of both spheres and powder. Chemical analyses for this material are listed in Table I. X-ray diffraction, autosorb and microreactor data were also obtained.

Catalyst sample "B" was prepared in the same manner as sample A but the treatment was conducted at room temperature. This procedure yielded no measurable quantity of fines. The dried spheres weighed 11.!2 g. Samples were analyzed for the chemical data of Table 1, with the remaining material being calcined at 500° C. for 2 hours prior to X-ray diffraction test and micro-reactor testing.

Catalyst sample "C" was prepared using a higher level of dilution at room temperature. In other regards it was equivalent to the preparation of sample A. The alumina spheres were slurried in 1000 g of deionized water and the ammonium hexafluorosilicate was dissolved in 500 g of deionized water. The dropwise addition required 4 hours. After washing and drying at 110° C., 9.67 g of spheres and 0.60 g of fines were obtained.

Catalyst sample "D" was prepared using the high concentration solution and high temperature as in the preparation of sample A. However, the solution was buffered with ammonium chloride equivalent to 2.08 g $NH_4Cl$ for the 3.5 g of ($NH_4$)$_2SiF_6$ used. This resulted in a 0.4 M concentration of ammonium chloride in the solution. The spheres and fines were washed separately to produce 10.96 g of spheres and 2.55 g of fines.

Catalyst sample "E" was prepared in a manner similar to sample A except the treating solution was diluted as for sample C and the treating solution was 0.4 M in ammonium chloride as for sample D. The spheres and fines were filtered separately. The spheres were washed with 1 liter of 0.2 M ammonium chloride solution and then with deionized water, dried at 110° C. and then calcined at 500° C. for 2 hours.

TABLE 1

| Catalyst Chemical Composition & Physical Data | | | | | |
|---|---|---|---|---|---|
| | Sample A | Sample B | Sample C | Sample D | Sample E |
| Aluminum, wt. % | 46.4 | 46.1 | 46.8 | 45.0 | 45.1 |
| Silicon, wt. % | 3.80 | 4.18 | 3.39 | 5.41 | 4.35 |
| Sodium, ppm | 8850. | 54. | 31. | 69. | 35. |
| Fluorine, wt. % | 0.91 | 1.19 | 0.98 | 2.24 | 2.21 |

The material of sample A had a surface area of 165 $m^2$/g (BET), a total pore volume of 0.72 cc/g and an average pore radius of 88 Angstroms.

Compared to the untreated alumina there was some decrease in surface area, total pore volume and average pore diameter for Sample A. This can be explained by several phenomena and the exact cause is not known. Silica deposited on the surface of the alumina structure could cause such a change in physical properties. There is also the possibility that residual fluoride compounds such as aluminum trifluoride may be present in the native pore structure of the alumina.

EXAMPLE 2

Heptane Cracking Tests

The catalyst samples prepared in Example 1 were subjected to a cracking test procedure referred to herein as the microreactor cracking test. A hydrogenation metal component is not present on the sample materials. The hydrogen partial pressure is quite low but the hydrogen/hydrocarbon ratio is rather high. In this test procedure an electrically heated reactor is loaded with 250 mg of 40-60 mesh particles made by crushing the sample spheres. Each catalyst is dried in situ for 30 minutes at 200° C. using flowing hydrogen. The catalyst is then subjected to a reduction treatment for one hour at 550° C. in flowing hydrogen.

The reactor is then brought to the desired operational temperature of 425° C. (inlet). The feed stream to the reactor is hydrogen gas which is saturated with 1-heptene at 0° C. and ambient atmospheric pressure. The inlet temperature is held constant while the flow rate of the 1-heptene saturated hydrogen is varied in a predetermined pattern. Analysis is performed by analyzing the effluent using a gas chromatograph. Samples for analysis are automatically taken after 15 minutes of onstream operation at 250 cc/min. feed gas flow, at 45 minutes with the feed flowrate at 500 cc/min., at 75 minutes with the feed gas flowrate at 1000 cc/min., at 105 minutes with the feed gas flowrate at 125 cc/min. and after 135 minutes with the feed gas flowrate at the initial 250 cc/min. In each instance the feed gas flowrate is adjusted after the previous sample is taken. The analytical results are given in Tables 2 and 3 below for the sample taken at each elapsed time during the test. All numbers reported are in weight percent and indicate the composition of the effluent stream. Compounds not listed on the table were not present at the minimum level reported by the analytical technique.

TABLE 2

| Cracking Test of Untreated Alumina | | | | | |
|---|---|---|---|---|---|
| FLOW RATE, CC/MIN | 250 | 500 | 1000 | 125 | 250 |
| INJECTION TIME, MIN | 15 | 45 | 75 | 105 | 135 |
| ETHANE | .18 | .1 | .07 | .15 | .1 |
| PROPANE | .26 | .14 | .08 | .25 | .16 |
| ISOBUTANE | .14 | .05 | | .13 | .06 |
| N-BUTANE | .27 | .14 | .07 | .28 | .15 |
| ISOPENTANE | .47 | .17 | .04 | .46 | .24 |
| N-PENTANE | .2 | .12 | .06 | .2 | .12 |
| 2,3-DIMETHYLBUTANE | | | | | |
| 2-METHYLPENTANE | .04 | | | .05 | |
| 3-METHYLPENTANE | .04 | | | .05 | |
| N-HEXANE | | | | .05 | |
| 2,2-DIMETHYLPENTANE | .44 | .18 | | .35 | .2 |
| METHYLCYCLOPENTANE | | | .05 | .04 | .03 |
| 2,4-DIMETHYLPENTANE | 1.36 | .58 | .29 | 1.21 | .68 |
| 2,2,3-ME3BUTANE | .03 | | | .03 | |
| 3,3-DIMETHYLPENTANE | .14 | .1 | .07 | | .07 |
| CYCLOHEXANE | .04 | | | | |
| 2-METHYLHEXANE | 13.92 | 10.31 | 5.81 | 13.69 | 11.17 |
| 2,3-DIMETHYLPENTANE | 5.67 | 3.08 | 1.12 | 5.75 | 3.78 |
| 1,1-ME2CYCLOPENTANE | .08 | .04 | | .12 | .07 |
| 3-METHYLHEXANE | 22.3 | 16.19 | 8.46 | 22.6 | 18.45 |
| 1,3-CIS-ME2CYCLOC5 | .39 | .21 | .08 | .39 | .24 |
| 3-ETHYLPENTANE | 2.27 | 1.56 | .85 | 2.26 | 1.7 |
| 1,2-TRANS-ME2CYCLOC5 | 2.13 | 1.81 | 1.72 | 1.95 | 1.61 |
| N-HEPTANE | 44.81 | 61.54 | 78.86 | 45.62 | 57.47 |
| 1,2-CIS-ME2CYCLOC5 | 3.44 | 2.69 | 1.78 | 3.08 | 2.66 |
| ETHYLCYCLOPENTANE | 1.27 | .94 | .57 | 1.21 | .98 |
| TOLUENE | .1 | .04 | .03 | .1 | .06 |

TABLE 3

| Cracking Test of Silica-substituted Alumina Sample A | | | | | |
|---|---|---|---|---|---|
| FLOW RATE, CC/MIN | 250 | 500 | 1000 | 125 | 250 |
| INJECTION TIME, MIN | 15 | 45 | 75 | 105 | 135 |
| ETHANE | .27 | .21 | .19 | .34 | .28 |
| PROPANE | 41.8 | 41.44 | 38.39 | 41.54 | 40.52 |
| ISOBUTANE | 25.06 | 30.02 | 24.32 | 25.57 | 30.59 |
| N-BUTANE | 23.09 | 18.79 | 13.25 | 23.41 | 20.4 |
| ISOPENTANE | 3.9 | 2.01 | 1.01 | 3.56 | 2.25 |
| N-PENTANE | 1.49 | .82 | .44 | 1.35 | .87 |
| 2,3-DIMETHYLBUTANE | .25 | .17 | .12 | .24 | .18 |
| 2-METHYLPENTANE | .69 | .55 | .38 | .65 | .55 |
| 3-METHYLPENTANE | .62 | .59 | .35 | .57 | .48 |

TABLE 3-continued

| Cracking Test of Silica-substituted Alumina Sample A | | | | | |
|---|---|---|---|---|---|
| FLOW RATE, CC/MIN | 250 | 500 | 1000 | 125 | 250 |
| INJECTION TIME, MIN | 15 | 45 | 75 | 105 | 135 |
| N-HEXANE | .38 | .32 | .22 | .35 | .3 |
| 2,2-DIMETHYLPENTANE | | .04 | .28 | | |
| METHYLCYCLOPENTANE | .25 | .16 | .1 | .2 | .17 |
| 2,4-DIMETHYLPENTANE | .08 | .26 | 1.13 | .08 | .15 |
| 2,2,3-ME3BUTANE | | | .07 | | |
| 3,3-DIMETHYLPENTANE | | | .08 | | |
| CYCLOHEXANE | | | | | |
| 2-METHYLHEXANE | .31 | 1.03 | 5.63 | .33 | .57 |
| 2,3-DIMETHYLPENTANE | .22 | .49 | 2.2 | .17 | .35 |
| 1,1-ME2CYCLOPENTANE | | | .04 | | .08 |
| 3-METHYLHEXANE | .45 | 1.44 | 6.73 | .36 | .78 |
| 1,3-CIS-ME2CYCLOC5 | .15 | .14 | .17 | .2 | .18 |
| 3-ETHYLPENTANE | .17 | .25 | .98 | .16 | .2 |
| 1,2-TRANS-ME2CYCLOC5 | .22 | .25 | | .21 | .26 |
| N-HEPTANE | .2 | .63 | 3.5 | .24 | .35 |
| 1,2-CIS-ME2CYCLOC5 | .18 | .2 | .23 | .19 | .24 |
| ETHYLCYCLOPENTANE | .1 | .12 | .12 | .07 | .16 |
| TOLUENE | .12 | .07 | .06 | .2 | .11 |

The data presented in Tables 2 and 3 indicate the treated alumina of Sample A had excellent cracking properties resembling those of a zeolitic material.

Figure 1:
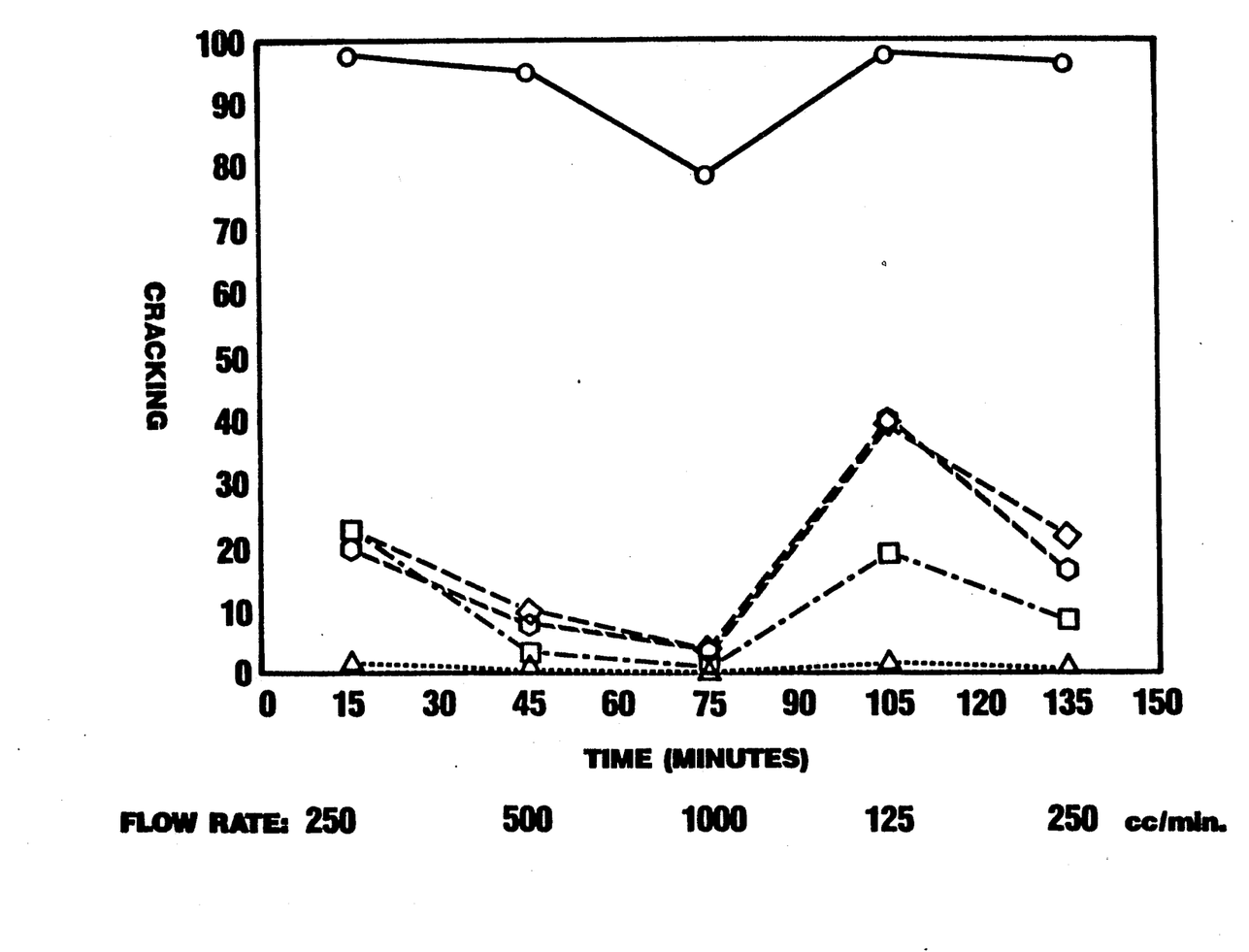
The Drawing illustrates the comparative 1-heptene cracking rates, as defined herein, of various silica-alumina hydrocracking catalyst base materials, untreated gamma alumina (triangle) and the novel silicon-substituted gamma alumina of the subject invention (circles) at various flow rates.

The drawing presents the results of the above described heptene cracking test for five different materials. The triangle shows the conversion (cracking) performed by the untreated alumina. Conversion or cracking is intended to indicate conversion of the feed hydrocarbon to hydrocarbons having fewer carbon atoms than the feed hydrocarbon with the number reported not including naphthenes, aromatics or isomerization products. The square shows the performance of a hydrocracking base material containing 33 wt. percent amorphous silica-alumina (balance is alumina). The hexagon and the diamond show the results using hydrocracking base materials containing 50 and 75 wt. percent silica alumina respectively. The circles show the results of the alumina of Sample A after being treated to effect silica-substitution. It is apparent that the silicon-substituted alumina had a cracking activity far superior to the amorphous silica-alumina containing materials.

The exact cause(s) of the cracking ability of the treated alumina is not known. It is speculated that this could be caused by the changed acidity or acid site strength caused by the insertion of the silicon or interaction between silicon and fluorine atoms. There may be effects caused by the residual fluoride content of the material or both.

EXAMPLE 3

A sample of 1/16 " spheres of gamma-alumina prepared according to the procedure in the U.S. Pat. No. 2,620,314 was ground to pass through a 40 mesh screen (420 micron). One hundred grams of this material was slurried in 1000 g deionized water and heated to 97° C. A separate solution of 35.4 g of ammonium hexafluorosilicate dissolved in 200 g deionized water was then added dropwise to the alumina slurry. This addition required 50 minutes during which time the reaction mixture had a temperature in the range of 83-91° C. After the addition was complete the reaction mixture was digested at 90° C. for one hour. The solids were separated from the reaction mixture by filtration and then washed with one liter of 0.2M aluminum sulfate solution at 50° C. This was followed by 400 mL deionized water, also at 50° C. The solids were dried at 100°

C. yielding 107.9 g of material. The dried sample contained 2.86 mass percent F (as received (AR)), 0.725 mass percent N(AR) and 4.97 mass percent Si(AR). It had a loss on ignition (LOI) at 900° C. of 12.74%. A portion of this dried sample was calcined in air at 500° C. for 5 hours in a muffle oven. After calcination the sample contained 2.47 mass percent F(AR), 0.36 mass percent N(AR) and 5.27 mass percent Si(AR). The mass percent reported is on an as received (AR) basis since calcination of the sample to remove all volatiles would remove the fluorine and nitrogen. The calcined sample had an LOI at 900° C. of 2.14%. The x-ray diffraction pattern of this material showed gamma-alumina as the only crystalline phase. A 125 milligram calcined sample was tested in a 1-heptene microreactor test as described in Example 2 at 425° C. inlet temperature and a feed gas flow rate of 500 cc/min. This material showed 66 weight percent cracking, with 95% selectivity to $C_3+C_4$ products.

EXAMPLE 4

A 250 mg sample of untreated gamma-alumina obtained by grinding 1/16" spheres as per Example 2 was tested according to the procedure set forth in Example 3 with the exception that the flow rate of feed gas was 1000 cc/min instead of 500 cc/min. This is equivalent to testing 125 mg of catalyst at a feed rate of 500 cc/min. Analysis of this alumina showed that no silicon or fluorine was present. This sample cracked only 0.34 weight percent of the feed and the selectivity for $C_3+C_4$ products was only 40%.

EXAMPLE 5

A sample of 1/16" spheres of gamma-alumina prepared as per U.S. Pat. No. 2,620,314 was treated with ammonium hexafluorosilicate in this example. The use of the spherical form of the alumina facilitates separation of the product from the reaction byproduct fines generated during treatment. Spherical gamma-alumina, 110 g, was slurried in 1000 g deionized water and heated to 62° C. A solution of 70.0 g ammonium hexafluorosilicate in 400 g deionized water was added dropwise to the alumina slurry over the course of 6 hours. The reaction temperature reached 84° C. after the first hour and was maintained in the 82–84° C. range for the rest of the addition. After addition of the ammonium hexafluorosilicate was completed, the mixture was digested for one hour at 83° C. before the liquid and fines were decanted. The spheres were washed with 5 liters of deionized water and dried at 100° C., yielding 135 g. The spheres were calcined at 500° C. for 5 hours in a muffle oven. The calcined material contained 4.76 mass percent Si(AR), 1.88 mass percent F(AR) and had an LOI at 900° C. of 21.46%. This material exhibited a cracking activity in the 1-heptene microreactor test performed at the conditions of Example 3 of 34 weight percent. The $C_3+C_4$ selectivity was 95%.

EXAMPLE 6

A 110 g sample of 1/16" spheres of gamma-alumina prepared as per U.S. Pat. No. 2,620,314 was slurried in 1000 g deionized water and heated to 80–90° C. A solution of ammonium hexafluorosilicate, 7.00 g in 200 g deionized water was added to the slurry over a 3 hour period, after which time the reaction mixture was digested for an additional 2 hours at 86° C. The spheres were separated from the reaction mixture by decantation, washed with 5.5 liters of deionized water and then dried at 100° C. Finally, dried spheres were calcined in a muffle oven for 5 hours at 500° C. The product contained 0.92 mass percent Si(AR) and 1.88 mass percent F(AR), and had an LOI at 900° C. of 8.27%. The calcined sample was tested using the heptene microreactor test at the conditions described in Example 3 and showed a cracking conversion of 15% and a $C_3+C_4$ selectivity of 93%.

EXAMPLE 7

In the following example, pilot plant tests were made using the material of the subject invention under conditions more similar to commercial hydrocracking operations than the prior example. The feedstream used in this test was a commercially produced vacuum gas oil (VGO) having the characteristics listed in Table 4.

The preparation of the catalyst used in this test began with the treatment of calcined 0.16 cm oil-dropped spheres suitable for use in the production of catalysts for catalytic reforming. The spheres were 100% alumina. (No binder, zeolite or silica-alumina content.) 160 g of spheres were slurried in 1000 cc of deionized water at 78° C. A solution of ammonium hexafluorosilicate was added dropwise over 1 hr 45 minutes. The solution contained 52.57 g of $(NH_4)_2SiF_6$ in 309.6 gm of deionized water. The slurry was stirred at 86° C. for one hour after the addition. The solids were washed with deionized water and dried at 110° C. The spheres were calcined at 630° C. for three hours with 3 percent steam. This finished the production of the silicon-substituted alumina, or silicon enhanced alumina (SEAL), used in this example.

The spheres contained about 4.1 mass percent silicon (VF) which is equivalent to 8.77 mass percent silicon dioxide. The spheres contained 41% aluminum (VF) and had a 1.21 wt. percent LOI (loss on ignition, 900° C.) value. The spheres contained 1.70 wt.% F on an as received basis.

This material was then treated in a conventional manner to place active hydrogenation metals on the spheres. The spheres were contacted with an aqueous solution of ammonium metatungstate and nickel nitrate in deionized water. The wet spheres were evaporated to dryness in contact with the solution and then calcined at 593° C. The spheres were then contacted with 3 percent steam for one hour at 593° C.. The finished catalyst contained approximately 1.6 wt.% nickel and 10 wt.% tungsten.

The finished catalyst was tested at a pressure of 2000 psig (13,790 kPa) at a hydrogen to hydrocarbon ratio of about 10,500 std cubic feet per barrel (1866 std m³/m³). The recirculated gas stream contained over 94 mole percent hydrogen. Table 5 presents other operating conditions and the results of two test periods. The first test was run at a catalyst life of 0.15 barrel per pound (0.0525 1³/kg) and the second reported test period was at 0.41 BPP (0.144 1³/kg). Conversion is the percent of charge material converted to products boiling below 700° F. (371° C.).

TABLE 4

| HYDROCRACKING FEEDSTOCK | |
|---|---|
| API @ 15.6° C. | 20.3 |
| IBP, °C. | 346 |
| 5% | 388 |
| 10% | 407 |
| 30% | 441 |
| 50% | 471 |
| 70% | 505 |

TABLE 4-continued
HYDROCRACKING FEEDSTOCK

| | |
|---|---|
| 90% | 551 |
| 95% | 573 |
| EBP | 595 @ 98% |
| LECO S, WT. % | 1.52 |
| KJELDAHL N, WT. % | 0.17 |
| BASIC N, PPM | 530 ± 10 |
| CARBON, WT. % | 85.6 ± 0.4 |
| HYDROGEN, WT. % | 12.0 ± 0.2 |
| AROMATICS, VOL. % | 51.4 |
| BROMINE NO. | 3.8 |
| MOL. WT. | 433 |

TABLE 5

| | | |
|---|---|---|
| LHSV, hr$^{-1}$ | 1.0 | 0.52 |
| Avg. Temp, °C. | 402.5 | 407.8 |
| Conversion, wt. % | 33.0 | 48.8 |
| Chemical H$_2$ conspt. (SCFB) | 616. | 1007. |
| C$_1$, wt % | 0.10 | 0.23 |
| C$_2$, wt % | 0.15 | 0.28 |
| C$_3$, wt % | 0.27 | 0.52 |
| C$_4$, wt % | 0.29 | 0.56 |
| C$_5$, wt % | 0.18 | 0.70 |
| Naphtha, wt % | 2.3 | 4.2 |
| Kerosene, wt % | 8.2 | 17.4 |
| Diesel, wt % | 16.6 | 20.0 |

The data of Table 5 indicates a significant amount of the VGO chargestock was converted to useful stillate products. Naphtha is reported as the C$_7$–300° F. (149° C.) cut, with kerosene being considered as having a boiling point range of 300–550° F. (149–288° C.) and diesel is the material boiling from 550–770° F. (288–410° C.). In evaluating this performance it must be remembered that due to the novelty of the catalyst this is the result of unoptimized performance conditions. The conditions were chosen based on standardized test procedures rather than on any desire to maximize total conversion, naphtha or diesel fuel production. The silicon insertion technique, amount of silicon or the metals content were not optimized. The pore structure of the base alumina and its preparation were also not optimized for hydrocracking. Nevertheless the catalyst is quite active. It may also be observed that diesel fuel production was approximately 4–5 times the naphtha production in the two tests. This implies a selectivity for middle distillate production.

As noted above in the Examples and in Table 1, the analysis of the silicon-substituted aluminas indicated the presence of fluorine. The references cited above discuss the problem of removing aluminum during the preferred silicon insertion technique, as the preferred technique tends to produce essentially insoluble aluminum trifluoride. In some samples evidence of aluminum trifluoride is observed, and some cracking may be attributed to the aluminum trifluoride. However, the cracking activity of the aluminas (no hydrogenation metal content) does not appear to correlate with the fluoride content. The cracking activity resembles that usually associated with hydrogen-form zeolites. The high level of cracking activity appears to correlate with the presence of a narrow line component in the silicon magic angle spinning nuclear magnetic resonance (MASNMR) spectra. This narrow line in the $^{29}$SiNMR is in the region of $-107$ to $-114$ ppm.

The presence of aluminum trifluoride in the treated aluminas indicates the first step in the silicon insertion process, the removal of aluminum, has occurred. The presence of fluorine is therefore not considered a negative development. As mentioned above, the treated alumina of the subject invention is presently expected to contain fluorine and may contain over 0.5 wt. percent fluorine.

While not wishing to be bound to any particular theory, it is postulated that some fluorine may remain in the treated aluminas as an anion to balance electrical charges. Hence it would be an analog to the presence of cations in synthesized zeolites. If this is the case the catalytic activity of the treated alumina may be influenced by the removal of the anion or by substitution with a different anion.

Another embodiment of the invention may be characterized as a fluorine-containing material which is manufactured by exposing alumina, or a formed particle containing alumina, to an aqueous solution of a fluorosilicate under silicon insertion promoting conditions, washing the alumina and calcining the alumina.

The compositions of the subject invention may comprise a porous refractory inorganic oxide matrix which forms between 2 and 98 wt. %, and preferably between 5 and 95 wt. % of the support of the finished catalyst composite. The matrix may comprise any known refractory inorganic oxide such as alumina, magnesia, silica, titania, zirconia, silica-alumina and the like and combinations thereof.

Preferred matrix materials are silica-alumina and alumina. A highly preferred matrix comprises a mixture of silica-alumina and alumina wherein said silica-alumina comprises between 5 and 45 wt. % of said matrix. A highly preferred matrix system for use in hydrocracking catalysts comprises an admixture of a dispersion of silica-alumina in alumina and a crystalline aluminosilicate zeolite as described in U.S. Pat. No. 4,576,711. Other matrix compositions may be preferred for other processes.

It is contemplated that the support of a hydrocracking catalyst could comprise from about 5 wt. % to about 45 wt. % untreated alumina. The catalyst may therefore contain less than 40 wt. percent silicon enhanced alumina. The support may comprise even larger amounts of silica-alumina or untreated alumina. The finished catalyst base may therefore comprise up to 95 wt.% untreated alumina, with the remainder being zeolite and/or silicon-substituted alumina. The catalyst base would be prepared by admixing these individual materials in a solid, gel or slurry form and then forming the support as by petization and extrusion. For instance a SEAL powder and untreated alumina powder may be admixed, formed into a dough and extruded to yield an uncalcined support. The preferred method of catalyst manufacture is to treat the formed and calcined support particle to produce the silicon enhanced alumina. This may simultaneously effect substitution of silicon into other aluminum-containing components of the support.

A suitable silica-alumina component for the base may be produced by any of the numerous techniques which are rather well defined in the prior art relating thereto. Such techniques include the acid-treating of a natural clay or sand, co-precipitation or successive precipitation from hydrosols. These techniques are frequently coupled with one or more activating treatments including hot oil aging, steaming, drying, oxidizing, reducing, calcining, etc. The pore structure of the support or carrier commonly defined in terms of surface area, pore diameter and pore volume, may be developed to specified limits by any suitable means including aging a hydrosol and/or hydrogel under controlled acidic or basic conditions at ambient or elevated temperature, or by gelling the carrier at a critical pH or by treating the carrier with various inorganic or organic reagents.

A finished catalyst, suitable for utilization in a hydrocarbon conversion process such as hydrocracking, should have a surface area of about 100 to 700 square meters per gram, a pore diameter of about 20 to about 300 Angstroms, a pore volume of about 0.10 to about 0.80 milliliters per gram, and apparent bulk density within the range of from about 0.50 to about 0.90 gram/cc. Surface areas above 100 m$^2$/g are preferred. Surface areas above 150 m$^2$/gm are greatly preferred. Surface areas can be determined by the well-known Brunauer-Emmett-Teller method (B-E-T) as described in *J. Am. Chem. Soc.* 60, 309 (1938) using nitrogen as an absorbate.

Alumina used in the subject catalyst may be any of the various hydrous aluminum oxides or alumina gels such as alpha-alumina monohydrate of the boehmite structure, alpha-alumina trihydrate of the gibbsite structure, beta-alumina trihydrate of the bayerite structure, and the like. A particularly preferred alumina for use as untreated alumina is referred to as Ziegler alumina and has been characterized in U.S. Pat. Nos. 3,852,190 and 4,012,313 as a by-product from a Ziegler higher alcohol synthesis reaction as described in Ziegler's U.S. Pat. No. 2,892,858. As stated above, a preferred alumina is presently available from the Conoco Chemical Division of Continental Oil Company under the trademark "Catapal". The material is an extremely high purity alpha-alumina monohydrate (boehmite) which, after calcination at a high temperature, has been shown to yield a high purity gamma-alumina.

It is understood that the precise physical characteristics of the carrier material such as shape and surface area are not considered to be limiting upon the scope of the present invention. The catalyst may, for example, exist in the form of pills, pellets, granules, broken fragments, spheres, or various special shapes such as trilobial extrudates, disposed as a fixed bed within a reaction zone. Alternatively, the catalyst may be prepared in a suitable form for use in moving bed reaction zones in which the hydrocarbon chargestock and catalyst are passed either in countercurrent flow or in cocurrent flow, or in fluidized-solid processes in which the chargestock is passed upward through a turbulent bed of finely divided catalyst, or in the suspension process, in which the catalyst is slurried in the chargestock and the resulting mixture is conveyed into the reaction zone. The chargestock may be passed through the reactor(s) in the liquid, vapor or mixed phase, and in either upward or downward flow.

The catalyst particles may be prepared by any known method in the art including the well-known oil drop and extrusion methods. In the case of the oil drop method, catalyst particles may be prepared by first suspending the selected zeolite powder in a suitable sol. Active metal components may also be incorporated into the sol. The sol admixture may then be passed as droplets into an oil bath which is maintained at an elevated temperature and retained in the oil bath until the sol droplets set to gelled spheres. The spherical particles may then be withdrawn from the oil bath and thereafter aged in a suspending medium at an elevated temperature for a suitable time period. The spherical particles may then be dried and calcined. If an alumina or silica-alumina oxide matrix is desired, the oil drop method may be carried out in accordance with U.S. Pat. No. 2,620,314 or 3,003,972, respectively, the teachings of which are incorporated herein by reference. An alternative method of producing spheroidal catalyst particles comprising alumina is described in U.S. Pat. No. 4,737,478 which is also incorporated herein by reference for its description of this method.

One contemplated method of preparing a hydrocracking catalyst composition containing the SEAL of the present invention is to simultaneously co-mull the selected components having substantial cracking activity (zeolite and silica-substituted alumina) with both alumina and amorphous silica-alumina. Prior to mixing, the admixed components are preferably crushed to a uniform powder form. Active metal components may also be incorporated in the admixture at this time but are preferably added after the particle forming steps are completed. After mulling, the admixture is extruded through a die having openings to produce an extrudate material of cylindrical or multilobed (U.S. Pat. No. 4,495,307) shape. The extrudate can be cut in pieces of a desired length of 0.5 to 1.5 cm and then dried and calcined at elevated temperatures and conditions known in the art.

The hydrogenation components may be added before, during or after completion of the oil drop, spray drying or extrusion methods used to form the catalyst particles. The hydrogenation components are preferably composited with the catalyst by impregnation after the selected catalytic and support type or matrix inorganic oxide materials have been formed, dried and calcined. Impregnation of the metal hydrogenation component into the particles may be carried out in any manner known in the art including evaporative, dip and vacuum impregnation techniques. In general, the dried and calcined particles are contacted with one or more solutions which contain the desired hydrogenation components in dissolved form. After a suitable contact time, the composite particles are dried and calcined to produce finished catalyst particles.

Hydrogenation components contemplated for incorporation are those catalytically active components selected from Group VIB and Group VIII metals and their compounds. All references herein to groupings according to the periodic table are to groups as defined in the form of the periodic table now in common use in U.S. as represented in the inside front cover of *The Chemical Engineers' Handbook*, Perry ed., 4th edition, 1963. Generally, the amount of hydrogenation components present in the final catalyst composition is small compared to the quantity of the other above-mentioned components combined therewith. The Group VIII component generally comprises about 0.1 to about 30% by weight, preferably about 1 to about 15% by weight of the final catalytic composite calculated on an elemental basis. The Group VIB component comprises about 0.05 to about 30% by weight, preferably about 0.5 to about 15% by weight of the final catalytic composite calculated on an elemental basis. The hydrogenation components contemplated include one or more metals chosen from the group consisting of molybdenum, tungsten, chromium, iron, cobalt, nickel, platinum, palladium, iridium, osmium, rhodium, rudinium and mixtures thereof.

The hydrogenation components will most likely be present in the oxide form after calcination in air and may be converted to the sulfide form if desired by contact at elevated temperatures with a reducing atmosphere comprising hydrogen sulfide, a mercaptan or other sulfur containing compound. The catalyst may be sulfided in situ by contact with a sulfur containing feedstock or it may be sulfided prior to contact with any feedstock by immediately after calcination exposing the composite to a sulfur containing compound in a reducing atmosphere. The production of hydrocracking catalysts using metal impregnation and calcination is described in U.S. Pat. No. 4,422,959 which is incorporated herein by reference.

When desired, a phosphorus component may also be incorporated into the catalyst. Phosphorus incorporation may be effected by either admixing the support materials with a phosphorus-containing compound prior to formation of the particles or including phosphoric acid in the impregnating solution. Usually phosphorus is present in the catalyst in the range of 1 to 30 wt. % and preferably 3 to 15 wt. % calculated as $P_2O_5$.

In addition, boron may also be present in the catalytic composite. Boron may be incorporated into the composite in any elemental or compound form and by any of the above described methods. That is, it may be incorporated during the particle formation step or boron may be present as a compound such as boric acid added to the impregnating solution. Boron may also be incorporated into the framework of the selected zeolites. In the latter instance, a modification of the Y-type zeolite occurs and a silica-alumina-boron-zeolite is formed.

At the present time it is believed that the order of the impregnation of the metals component into the finished support and the treatment of the alumina to insert silicon does not significantly effect catalyst performance. It is generally preferred that both the silicon substitution and the metals addition steps are performed after the catalyst particle has been formed into its final shape. It is generally easier and less expensive to work with the formed particles.

The subject catalysts are useful for hydrocracking a hydrocarbon feedstock to a more valuable product of lower average boiling point and lower average molecular weight. The catalysts are useful for the production of gasoline and middle distillate fractions boiling in the range of about 300–700° F. (149–371° C.) as determined by the appropriate ASTM test procedure. Typical feedstocks include virtually all hydrocarbon fractions including heavy mineral and synthetic oils and fractions thereof. Thus, such feedstocks as naphtha, straight run gas oils, vacuum gas oils, demetallized oils, atmospheric residue, deasphalted vacuum bottoms, coker distillates, cat cracker distillates, shale oil, tar sand oil, coal liquids, and the like are contemplated. Preferred feedstocks include gas oils having at least 50% volume of their components boiling above 700° F. (371° C.). The hydrocracking feedstock may contain nitrogen usually present as organonitrogen compounds in amounts between 1 ppm and 1.0 wt. %. The feed will normally contain sulfur containing compounds sufficient to provide a sulfur content greater than 0.15 wt. %. It may also contain mono- and/or polynuclear aromatic compounds in amounts of 80 volume percent and higher.

Hydrocracking conditions employed in the subject process are those customarily employed in the art for hydrocracking processes. Hydrocracking reaction temperatures are in the range of 400° to 1200° F. (204–649° C.), preferably between 600° and 950° F. (316–510° C.). Reaction pressures are in the range of atmospheric to about 3,500 psig (24,132 kPa g), preferably between 200 and 3000 psig (1379–20,685 kPa g). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178–8,888 std. $m^3/m^3$), preferably between 2,000 and 30,000 scf per barrel of charge (355–5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

This embodiment of the subject process may accordingly be characterized as a hydrocarbon conversion process which comprises contacting a distillate hydrocarbon stream with zeolite-free catalyst particles comprising a Group VIII metal and a gamma alumina, which alumina comprises from 0.4–3 wt.% fluorine and has been isomorphously substituted with at least 0.1 wt. percent silicon, in a reaction zone maintained at hydrocracking promoting conditions and recovering a product stream having a lower average molecular weight than the distillate hydrocarbon stream.

The use of interlayered or pillared clays in hydrocracking and hydrotreating catalysts has been the subject of much recent research activity. The production of such clay materials is described in U.S. Pat. Nos. 4,666,877; 4,719,191; 4,761,391 and 4,766,099 which are incorporated herein by reference in their entirety for their teaching as to the use and preparation of such clays. These materials are based upon smectite clays which are naturally occurring but can also be synthesized. Examples of the clays included within the smectite clays are montmorillonite clay, which contains aluminum in octahedral coordination with surrounding layers of silicon in tetrahedral coordination, and hectorite clay having magnesium and lithium in the octohedral sites. Other types of smectite clays are beidellite, nontronite and saponite.

As stated in above cited U.S. Pat. No. 4,761,391 the platelets which comprise a swelling smectite clay can be separated by as much as 6 to 10 Angstroms by intercalating thermally stable, robust, three dimensional cations between the platelets of the clay. Clays modified in this manner are referred to as pillared clays or crosslinked smectites. The size, shape and nature of the intercalated cations allow them to impart acidity to the clay while serving as pillars to prop apart the layers of the clay, thereby exposing the surface of the layers for catalytic reactions. The fairly homogeneous distribution of pillars in the interlayered spaces of the clay form an array of rectangular openings, typically about 8 by 15 Angstroms in size, which enable the pillared clay to behave like a two dimensional sieve. By adjusting the size of the intercalated cations or the spacing between such cations or both, the pore size of the pillared clay may be adjusted to suit a particular application.

This same reference also describes the production of what are termed delaminated clays. The difference from pillared clays is the unordered nature or arrangement of the platelets. The platelets are not all in a flat face-to-face orientation and hence have irregularities providing increased porosity. This provides a material having micropores between pillared platelets and macropores between nonparallel surface platelets. The use of delaminated clays will provide a range of pore sizes leading to a catalyst suitable for processing heavy metals content feeds.

A variation of these materials is the fluorinated bridged smectites described in U.S. Pat. No. 4,766,099 cited above. These materials appear to fall within the general category of pillared clays.

Accordingly another embodiment of the invention is a hydrocarbon conversion catalyst, preferably a hydrocracking or cracking catalyst comprising a pillared clay or a delaminated clay and a silicon-substituted alumina. These hydrocarbon conversion catalysts may also contain a metal hydrogenation component. Further, in addition to the silicon-substituted alumina, pillared or delaminated clay, and hydrogenation component, the catalyst may contain silica-alumina, an ultrastable Y-zeolite or a pentasil zeolite. One contemplated catalyst 15 composition comprises an admixture comprising from 10–45 wt.% pillared clay, from 10–55 wt.% silicon-substituted alumina, from 5-25 wt.% of a conventional silica-alumina and a metal hydrogenation component. Another specifically contemplated catalyst composition comprises from 10–65 wt.% pillared or delaminated clay, from 10–40 wt.% silicon-substituted alumina, from 2-20 wt.% Y-zeolite and from 0.5–15 wt.% metal hydrogenation component. These catalysts would be used in hydrocracking or hydrotreating processes operated in the customary manner as described herein and as generally known in the art.

A specific embodiment of the invention therefore comprises contacting a $C_6$-plus distillate hydrocarbon stream with a catalyst in a reaction zone maintained at hydrocracking conditions and recovering products having reduced molecular weights, with the catalyst comprising a silicon-substituted alumina having a silicon to fluorine mole ratio of from about 0.8:1 to about 1.3:1 and which has been isomorphously substituted with at least 0.1 wt. percent silicon, an active metal hydrogenation component comprising at least one Group VIB or Group VIII metal and at least 5 wt. percent of a delaminated or pillared clay.

One method of FCC catalyst preparation comprises admixing the subject silicon-substituted alumina with a hydrogel or sol such as a peptized boehmite alumina or colloidal silica. Cracking catalysts used in FCC processes are often produced by "spray drying" a newly formed mixture of an acidic silica sol and an alkaline zeolite slurry. In the instance of the subject invention, the alkaline slurry may contain a silicon-substituted alumina instead of a zeolite or the alkaline slurry may contain both a silicon-substituted alumina and a zeolite. The acidic silica sol may be prepared by mixing sodium silicate with water and a mineral acid such as sulfuric or hydrochloric acid. The pH of the sol should be between 0.5 and 4.5. This acidic sol is then admixed with the alkaline slurry containing the zeolite and/or silicon-substituted alumina, preferably at a temperature of from about 70 to about 110° F. (21–43° C.) Gellation occurs rapidly and may be done in a batch procedure under constant admixing followed by pH adjustment to 6–8 as described in U.S. Pat. No. 3,503,873 or by rapid admixing with the alkaline (pH 10 to 14) slurry and spraying as per U.S. Pat. No. 4,126,579, with both references being incorporated herein by reference for their teaching of catalyst preparation techniques. The particles formed by gellation are then dried and washed free of soluble salts. The materials can then be washed with an aqueous ammoniacal solution, e.g., ammonium sulfate, to remove sodium or other alkali metal. The required amount of each component in the two streams being admixed can be calculated based upon the desired composition of the finished catalyst.

The finished catalyst may alternatively be prepared using the procedure specified in U.S. Pat. No. 4,499,197 which is also incorporated herein by reference. In this procedure sodium aluminate and sodium silicate solutions are reacted during intense mixing to produce a gelled mixture having a pH of 12 to 12.5. This gelled mixture is reacted with an acidic salt solution comprising aluminum and aged to yield a silica-alumina cogel of a desired porosity. The zeolite and/or silica-substituted alumina can be admixed into the sodium aluminate solution. Clay, such as a delaminated or pillared clay, can also be compounded into the composite by admixture into one of the reactant streams. A SEAL material is not acid sensitive, as are zeolites, and can be present in either a basic or acid solution or slurry during the catalyst preparation.

Another method of preparing catalysts suitable 15 for use in catalytic cracking is disclosed in U.S. Pat. 4,760,040 which is incorporated herein by reference. Another embodiment of the subject invention may accordingly be characterized as the preparation and use of catalysts formed by dispersing a crystalline aluminosilicate and clay in a hydrogel slurry comprising a silicon substituted alumina containing phosphorus in an atomic ratio of phosphorus to aluminum of 0.01–0.56 and spray drying this mixture and calcining. The silica-substituted alumina may be a pseudoboehmite or fibrous pseudoboehmite. Aging the slurry at a pH above about 10 at about 40–90° C. has been described as beneficial to the catalyst quality. Suitable clay materials include kaolin, bentonite, and halloysite, with kaolin being preferred. Phosphorus may be added using a soluble salt or phosphoric acid. Calcination may be performed in the customary manner, such as the use of a rotary or belt calciner operating at 400–800° C. for a residence period of 1–6 hours. The finished catalyst should have a total pore volume in the range of about 0.3–0.75 cc/g. Total pore volume is measured by the nitrogen adsorption (Autosorb) method. Various metals can be added to the material formed by this method to increase cracking activity and/or selectivity. The metal components may be added to the slurry by use of a suitable salt or may be added to the composite by impregnation using known techniques. Suitable metal components include the alkali metals, such as lithium, and the alkaline earth metals including calcium and magnesium. Rare earth metals may also be added. The final composite may contain from about 0.2–5.0 wt. percent of one or more of these metals.

One widely used component of FCC catalysts is zeolite Y. A form of zeolite Y which is very useful in the FCC process is disclosed in U.S. Pat. No. 3,293,192 and referred to as a synthetic ultrastable aluminosilicate of the Y-type. Further description of these zeolites is given above. In one limited embodiment of the subject invention FCC cracking catalysts are produced which comprise ultrastable Y-zeolite having a unit cell size less than about 24.45 Angstroms admixed with or bound together with a silicon-substituted alumina. The catalyst may contain from about 3 to about 45 wt. percent ultrastable Y-type zeolite and preferably contains from about 5 to 25 wt. percent ultrastable Y-type zeolite.

The use of fluidized catalytic cracking (FCC) processes to convert residual hydrocarbons is a widely commercialized process well known to those versed in the hydrocarbon conversion arts. It is described in detail in a voluminous collection of references including U.S. Pat. Nos. 4,551,229; 4,504,380; 4,384,948; 4,340,566 and 4,211,636. The teaching of the last three mentioned patents is incorporated herein by reference for their description of the operation of FCC processes. A traditional chargestock for an FCC process is a relatively high boiling chargestock such as a vacuum gas oil (VGO), which typically has a boiling point range falling between about 343 to 552 degrees Celsius (650 to 1050° F.) and is prepared by vacuum fractionation of an atmospheric residue. The FCC process can also be applied to heavier petroleum-derived feedstocks or to liquid hydrocarbons derived from shale oil, tar sands or coal liquefaction. In an FCC process the chargestock is contacted with a fluidized bed of regenerated (fresh) catalyst at high temperature conditions, normally in the absence of added hydrogen. Contacting is normally performed using an upward flowing bed of catalyst, with average contact times in the range of about 2 to about 5 seconds being employed. Contacting is performed at about 900–1400° F. (482–760° C.) and an absolute pressure of from atmospheric to about 9 bars. The conversion of at least 25 wt. percent of the chargestock to lower boiling hydrocarbons is normal. The effluent of the reaction zone is quickly separated from the catalyst and fed to product recovery facilities normally comprising an initial fractional distillation column. The reaction zone effluent is therein separated into a stream of light gases and one or more product streams—typically gasoline, diesel fuel and heavy distillate product streams.

Accordingly one embodiment of the subject invention is a fluidized catalytic cracking process which comprises contacting a heavy hydrocarbonaceous chargestock, such as an HVGO, at FCC reaction zone operating conditions with a fluidized bed of a catalyst comprising a silicon enhanced alumina (SEAL), separating the catalyst from the reaction products, recovering the reaction products and passing used catalyst to a catalyst regeneration zone. The silicon enhanced alumina will preferably contain about 0.2 to about 18 wt. percent isomorphously substituted silicon. It may contain over 0.4 wt.% fluorine and will have a fluorine to silicon ratio of about 0.8:1 to 1.3:1.

As indicated above, the term "hydrocarbon conversion" is intended to refer to processes, or reactions, which reduce the average molecular weight of a feedstream and/or change its structure by isomerization or cyclization reactions. The term hydrocarbon conversion is intended to include catalytic dewaxing. Catalytic dewaxing conditions, chargestocks, methods and procedures have been widely described in the patent literature such as in U.S. Pat. Nos. 4,872,968; 4,818,369; 4,859,311; 4,867,861 and 4,880,760 which are incorporated herein by reference. The term "catalytic dewaxing" is intended to include hydrodewaxing. Preferably the reaction zone is operated with hydrogen present at a molar ratio to the feed above 1, and preferably from 2 to 100. The process is generally performed at a liquid hourly space velocity between about 0.2 and about 15, a temperature between about 260 and about 400° C. and a pressure between about 3,450 and 11,800 kPa. As known in the art, these conditions can be adjusted if added hydrogen is not passed into the reaction zone.

What is claimed:

1. A process for reducing the average molecular weight of hydrocarbons which comprises contacting a $C_6$-plus feed hydrocarbon with an essentially zeolite-free solid catalyst at conversion-promoting conditions and recovering a product, with the catalyst comprising a silicon-substituted alumina prepared by contacting an alumina with a solution containing silicon and fluorine at substitution promoting conditions, with the silicon-substituted alumina containing from 0.1 to 15.0 wt. percent silicon from 0.1 to 15 wt. percent fluorine and with the silicon-substituted alumina having a silicon to fluorine mole ratio of about 0.8:1 to 1.3:1.

2. The process of claim 1 further characterized in that the catalyst comprises at least one Group VIB or VIII metal.

3. The process of claim 2 further characterized in that the silicon-substituted alumina is no supported within a matrix of a different inorganic oxide.

4. The process of claim 1 further characterized in that the catalyst comprises an admixture of silica-alumina and silicon-substituted alumina.

5. The process of claim 4 further characterized in that the catalyst comprises a Group VIB or VIII metal.

6. The process of claim 2 further characterized in that the silicon-substituted alumina is present in a matrix comprising silica alumina.

7. The process of claim 2 further characterized in that the silicon-substituted alumina is present in a matrix comprising alumina.

8. The process of claim 1 further characterized in that the process is conducted in the presence of added hydrogen.

9. The process of claim 1 further characterized in that the silicon-substituted alumina contains 0.2–12.0 wt.% silicon.

10. A process for reducing the average molecular weight of hydrocarbons which comprises contacting a feed stream comprising $C_6$-plus hydrocarbons and hydrogen with a solid catalyst maintained at conversion-promoting conditions and recovering a product stream, with the catalyst comprising an alumina comprising an alumina, wherein the alumina comprises 0.1 to 18.0 wt. percent isomorphously substituted silicon having a silicon to fluorine mole ratio of from about 0.8:1 to about 1.3:1.

11. The process of claim 10 wherein the catalyst comprises a Group VIB or Group VIII metal.

12. The process of claim 10 wherein the alumina comprises at least 0.5 wt. percent fluorine.

13. The process of claim 10 wherein the catalyst comprises a Y-zeolite.

14. A hydrocarbon conversion process which comprises contacting a distillate hydrocarbon stream with zeolite-free catalyst particles comprising a Group VIII metal and a gamma alumina, which alumina comprises from 0.4–3 wt.% fluorine and has been isomorphously substituted with at least 0.1 wt. percent silicon, in a reaction zone maintained at hydrocracking promoting conditions and recovering a product stream having a lower average molecular weight than the distillate hydrocarbon stream.

15. The process of claim 14 wherein the catalyst comprises a second alumina, which is substantially free of silicon.

16. The process of claim 14 wherein the catalyst comprises from 5–25 wt.% conventional silica-alumina.

17. The process of claim 16 wherein the catalyst comprises less than 40 wt.% silicon-substituted gamma alumina.

18. A hydrocracking process which comprises contacting a distillate hydrocarbon feed stream with an essentially zeolite-free catalyst comprising an active metal hydrogenation component which component comprises a Group VIB or Group VIII metal and an alumina, which alumina contains at least 0.1 wt. percent isomorphously substituted silicon, at least 0.3 wt.% fluorine and has a fluorine to silicon mole ratio of about 0.8:1 to 1.2:1, in a reaction zone maintained at hydrocracking conditions and recovering a product stream having a lower average molecular weight than the distillate hydrocarbon feed stream.

19. The process of claim 18 further characterized in that the catalyst comprises a Y-zeolite.

20. The process of claim 19 further characterized in that the catalyst comprises a dispersion of silica-alumina in an alumina matrix.

21. The process of claim 20 further characterized in that the alumina matrix comprises silicon-substituted alumina.

* * * * *